United States Patent

Nakamura

[11] Patent Number: 5,923,817
[45] Date of Patent: Jul. 13, 1999

[54] VIDEO DATA SYSTEM WITH PLURAL VIDEO DATA RECORDING SERVERS STORING EACH CAMERA OUTPUT

[75] Inventor: Shunichiro Nakamura, Tokyo, Japan

[73] Assignee: Mitsubishi Denki Kabushiki Kaisha, Tokyo, Japan

[21] Appl. No.: 08/804,147

[22] Filed: Feb. 20, 1997

[30] Foreign Application Priority Data

Feb. 23, 1996 [JP] Japan .................................. 8-036642

[51] Int. Cl.⁶ ....................................................... H04N 5/76
[52] U.S. Cl. ........................... 386/124; 386/125; 386/126
[58] Field of Search .............................. 386/46, 124, 125, 386/126, 52, 95, 111, 68, 112, 123; 348/7, 159; H04N 5/76, 5/92

[56] References Cited

U.S. PATENT DOCUMENTS

| | | |
|---|---|---|
| 5,031,218 | 7/1991 | Galand et al. .............................. 360/48 |
| 5,497,244 | 3/1996 | Chargin, Jr. et al. .................... 386/125 |
| 5,510,905 | 4/1996 | Birk ......................................... 386/125 |
| 5,530,557 | 6/1996 | Asit et al. ................................ 386/125 |
| 5,544,313 | 8/1996 | Shachnai et al. . |
| 5,559,764 | 9/1996 | Chen et al. .............................. 386/125 |
| 5,719,985 | 2/1998 | Ito et al. .................................. 386/125 |
| 5,754,730 | 5/1998 | Windrem et al. ........................ 386/124 |

FOREIGN PATENT DOCUMENTS 657801  11/1994  European Pat. Off. .

*Primary Examiner*—Huy Nguyen

[57] ABSTRACT

A video data record/playback system includes a plurality of magnetic disk devices that sequentially store video data in scattered form, a plurality of servers 5 that are respectively connected to the plurality of magnetic disk devices and access the data, a control device 9 that is connected to the plurality of servers 6 and sequentially records video data of a video camera 8 to the magnetic disk devices as data, and a monitor device 4 that is connected to the plurality of servers 6, sequentially reads data stored in the disks, and displays the read data.

10 Claims, 4 Drawing Sheets

VIDEO DATA SYSTEM WITH PLURAL VIDEO DATA RECORDING SERVERS STORING EACH CAMERA OUTPUT

BACKGROUND OF THE INVENTION

1. Field of the Invention

The invention relates to a video data record/playback system including video cameras, monitor devices, recording devices, and the like.

2. Description of the Related Art

A video monitor system in which video pictures are taken by arranging video cameras at various locations in a factory or the like and in which the video pictures from all of the thus arranged video cameras can be seen intensively at the central monitor station are now, extensively employed. While conventional video recordings have been made mainly with analog signals, recent development in digital video technology increasingly encourages the use of digital signals, which in turn has made it possible to handle video/audio data directly as computer data.

FIG. 10 shows an example of such a video monitor system. In FIG. 10, reference numeral 1 denotes a video camera; 2, a video transmitting device; 3, a network; and 4, a monitor device. The video cameras 1 that are arranged at various locations are regularly send signals of video pictures taken by themselves to the video transmitting device 2.

Operation of the thus constructed system will be described. When the operator specifies a video transmitting device 2 through a monitor device 4, such specified video transmitting device 2 selects a video picture of a similarly specified single video camera 1, subjects the video picture to an analog-to-digital conversion process, subjects the converted digital video data to a data compression process, etc., and thereafter transfers the thus processed video data to the monitor device 4 regularly through the network. The monitor device 4 expands the compressed video data and plays back the expanded data on the screen thereof. It is in this way that a video picture of an arbitrarily selected video camera 1 can be displayed on the screen of a monitor device 4. By watching at a monitor device 4, a video picture of one of the video cameras arranged at various locations, while arbitrarily switching the video cameras, operations in a factory can be monitored as a whole. On the other hand, with respect to video picture recording, analog video picture recordings are usually made for each camera. In the example shown in FIG. 10, a recording device is arranged within a video camera 1 or a video transmitting device 2, and the recorded tape is seen off-line later. This is how the conventional video monitor system is operated.

As described above, in the conventional art, a recording device is arranged close to a video camera 1, the video data generating means, and makes a recording off-line. As a result, recording devices whose number is substantially equal to the number of video cameras 1 are required, which in turn makes the system expensive. In addition, in order to see recorded video pictures, the operator must later go to the place where the recording device is located and take a recording medium out of the recording device, which is cumbersome.

SUMMARY OF THE INVENTION

The invention has been made to overcome the aforementioned problems, and therefore an object of the invention is to provide a video data record/playback system that allows a recorded video picture of an arbitrary video data generating means to be seen freely at any time from a monitor station since recording devices are integrated at the center.

Another object of the invention is to provide a video data record/playback system that, even if a recorded video picture of a single video data generating means is seen by a plurality of monitor stations simultaneously, can arbitrarily implement playback, fast forward, rewind, etc. by video data playback devices arranged in the respective monitor stations. Further, still another object of the invention is to provide a video data record/playback system that can record and play back all video pictures of many video data generating means simultaneously through a storage device arranged at a single place.

A video data record/playback system of the invention includes: a plurality of data generating means for generating continuous video data; a plurality of storage devices for storing digitized recorded data based on the video data on a block basis; a server for accessing the recorded data on the block basis with respect to the plurality of storage devices; a control device for processing the continuous video data of each one of the data generating means into the block-based recorded data and storing the block-based recorded data onto the plurality of storage devices horizontally through the server in a predetermined order; and a video data playback device for playing back and displaying block-based recorded data by reading the block-based recorded data corresponding to an arbitrary one of the data generating means from an arbitrary position in the plurality of storage devices through the server.

A video data record/playback system, which is another aspect of the invention, is such that a plurality of servers for accessing recorded data on a block basis with respect to a plurality of storage devices are arranged; a control device stores the recorded data in the plurality of storage devices on the block basis through the plurality of servers horizontally in a predetermined order; and a video data playback device plays back and displays block-based recorded data by reading the block-based recorded data corresponding to an arbitrary data generating means from an arbitrary position in the plurality of storage devices through the plurality of servers.

A video data record/playback system, which is still another aspect of the invention, is such that a plurality of video data playback devices are arranged; and an arbitrary video data playback device plays back and displays block-based recorded data by reading the block-based recorded data corresponding to an arbitrary data generating means from an arbitrary position in a plurality of storage devices through a server.

A video data record/playback system, which is still another aspect of the invention, is such that a server has a table indicating a predetermined order in which block-based recorded data corresponding to video data of each data generating means is stored in a plurality of storage devices horizontally; and a video data playback device plays back and displays block-based recorded data by reading the newest one of the block-based recorded data corresponding to an arbitrary data generating means from the plurality of storage devices based on the table.

A video data record/playback system, which is still another aspect of the invention, includes: a plurality of data generating means for generating continuous video data; a plurality of storage devices for storing digitized recorded data based on the video data on a block basis; a plurality of servers being connected to the plurality of storage devices and accessing the recorded data on the block basis with respect to the plurality of storage devices; a control device for processing the continuous video data of each one of the data generating means into the block-based recorded data, calculating a parity value from a predetermined number of the block-based recorded data bit-to-bit, and transferring the predetermined number of pieces of the block-based recorded data and the parity value to the plurality of servers horizontally so that the predetermined number of pieces of the block-based recorded data and the parity value are stored in the plurality of storage devices in a predetermined order; and a video data playback device that, if one of the servers has failed when the block-based recorded data corresponding to an arbitrary one of the data generating means is to be played back while read from the plurality of storage devices through the servers, plays back and displays block-based recorded data by recovering from the parity value the block-based recorded data stored in a storage device connected to the failed server.

A video data record/playback system, which is still is another aspect of the invention, is such that tables are arranged at least in two of a plurality of servers; a control device forms recorded data for a predetermined number of pieces of block-based recorded data corresponding to each data generating means and a parity value into a parity group, and writes to the tables an order of storing the parity group in the plurality of storage devices; and a video data playback device plays back and displays recorded data by reading from the plurality of storage devices the recorded data of the newest parity group corresponding to an arbitrary data generating means based on the tables.

A video data record/playback system, which is still another aspect of the invention, is such that a video data playback device has a buffer for accommodating data for a single parity group including a predetermined number of pieces of block-based recorded data and a parity value corresponding to each data generating means; when the recorded data is played back, the video data playback device takes the data for the single parity group into the buffer from a plurality of storage devices in a predetermined order, and plays back and displays block-based recorded data by recovering the block-based recorded data stored in a storage device connected to a failed server.

A video data record/playback system, which is still another aspect of the invention, is such that a video data playback device plays back and displays video data of a predetermined data generating means by directly inputting block-based recorded data outputted from a control device.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the invention with reference to the accompanying drawings.
(Embodiment 1)

Figures 1, 2:
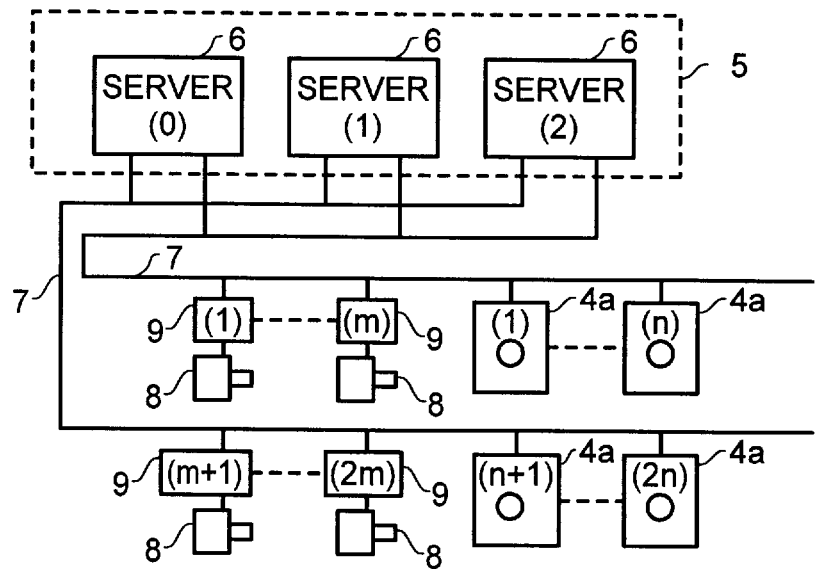
FIG. 1 is a constructional diagram showing a video data record/playback system according to a mode of embodiment of the invention.
FIG. 2 is a diagram illustrative of a data arrangement on disks in mode of embodiment 1 of the invention.

Embodiment 1 of the invention will now be described with reference to the drawings. FIG. 1 is a constructional diagram showing a video data record/playback system according to Embodiment 1 of the invention. In FIG. 1, reference numeral 5 denotes a video server integrating a plurality of servers; 6, a server that is a component of the video server 5; 7, a 100-Mbps Ethernet LAN; 8, a video camera that is a video data generating means; 9, a video camera control device; 4a, a monitor device having the function of a personal computer and serving as a video data playback device. FIG. 2 is a diagram illustrative of a data arrangement on disk devices contained in servers 6. In FIG. 2, reference numeral 10 denotes a magnetic disk device; 11, a single block of data assigned to the magnetic disk device 10, each block having 64 KB. As is understood from FIG. 2, each server 6 has 3 built-in disk devices.

Then, an operation of the video data record/playback system will be outlined. In FIG. 1, a total of 2×m video cameras 8 are located at monitor points in a factory or the like the operation of which are to be monitored, and send video data to the corresponding video camera control devices 9 at all times. After converting the video data from analog to digital data, each video camera control device 9 subjects the converted data to a data compression process in a compression format called "motion JPEG". As a result of this process, 7.5-frame/sec motion JPEG data is generated, which becomes data whose bit speed is 1.2 Mbps. A video stream whose bit speed is 1.2 Mbps generated by each video camera control device 9 is sent to and sequentially recorded by the video server 5 through the corresponding LAN 7. On the other hand, an arbitrary video stream recorded in the video server 5 can be played back on a monitor device 4a. In this case, the video server 5 sends requested video data to the monitor device 4a that made a request. Data transfer rate in this case is also 1.2 Mbps. Upon receipt of the requested data, the monitor device 4a expands the received video data from the motion JPEG compression format and displays the expanded video data on the screen thereof. This is the outline of the operation.

The capacity and number of components of this video data record/playback system will be described next. In FIG. 1, m video camera devices 9 and n monitor devices 4a are connected to a LAN 7, which is constructed of a 100-Mbps Ethernet. The maximum design number that is connectable to a single LAN is set to m+n=60. When all the 60 devices operate, total data transfer rate becomes 1.2 Mbps×60=72 Mbps (<100 Mbps=maximum transfer capacity of a LAN). While m and n devices can be connected to each of the two LANs in this example for simplification, m' and n' devices (m≠m', n≠n', m'+n'≦60) may be connected to one of the two LANs. On the other hand, since the server 6 has 3 disk devices (only one disk device cannot provide the same capacity as this), a total of 40 video streams whose bit speed is 1.2 Mbps can be inputted and outputted. As shown in FIG. 1, a server 6 has two LAN ports, and is connected to two 100-Mbps Ethernets. By "the total of 40 video streams" it is intended to mean the total of video streams that can be handled by these two LANs. For example, one of the two LANs may handle 30 video streams and the other LAN 10 video streams. Since there is a total of 3 servers 6 to constitute the video server 5 in FIG. 1, a total of 40×30=120 video streams can be inputted to and outputted from the video server 5 in mathematical terms. On the other hand, 2m video camera control devices 9 and 2n monitor devices 4a total 2m+2n=120, so that it is designed to balance the server side with the client side in mathematical terms. Hence, the system can work with all of a total of 120 video camera control devices 9 and monitor devices 4a in operation.

The main feature of this video data record/playback system will be described next. In FIG. 2, reference numeral 11 denotes a data block to be written on the magnetic disk 10. The data block is 64 KB large. Indicated is a system in which recorded data corresponding to each video camera 8 is stored in the corresponding magnetic disk device 10. Video data sent from a video camera 8 is first compressed by the corresponding video camera control device 9, then buffered, and then sent to the video server 5 as recorded data through the corresponding LAN 7 every 64 KB. The compressed recorded data sent from a first video camera 8 (1) is sequentially stored in upper two rows in columns of blocks as shown in FIG. 2. That is, the compressed recorded data is stored in such a manner that a first group of 64 KB is stored in block (0) (the uppermost row of disk (0) in server 6 (0)) and that a next group of 64 KB is stored in block (1) (the uppermost row of DK (1) in server 6 (1)). After the compressed recorded data has been transferred to the last block (17) (the second row from the uppermost row of DK (2) in server 6 (2)), data is sequentially overwritten back onto the aforementioned block (0). That is, here, video data is recorded while overwritten every 7.68 sec (=64 KB×18 blocks×8 bits)/1.2 Mbps). The reason why such a short repeating interval has been selected in this example is for simplification purposes. This interval is generally set to tens of minutes to several hours.

Figure 3:
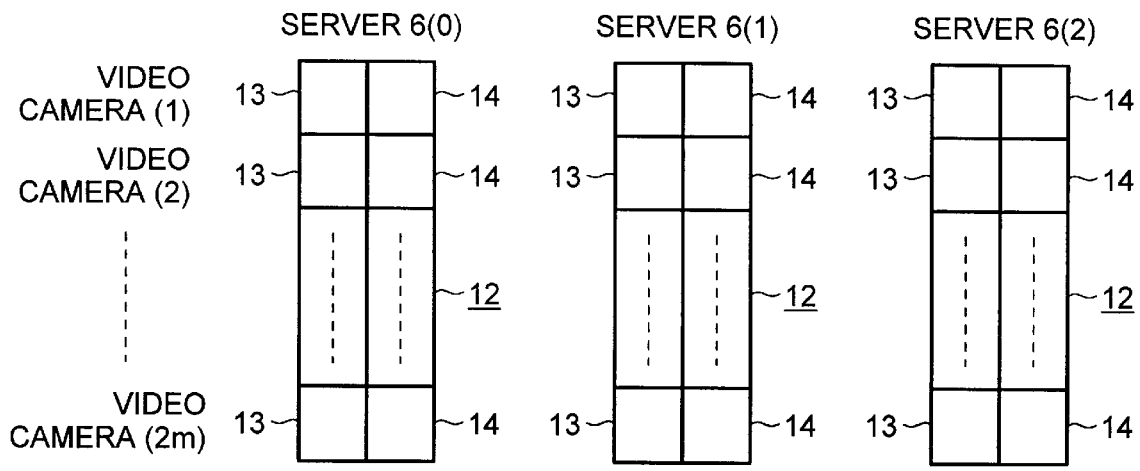
FIG. 3 is a diagram showing a format of a time stamp table in the mode of embodiment 1 of the invention.

FIG. 3 is a diagram showing a format of a time stamp table that when a video camera control device 9 has ended writing 64 KB of data to any one of the servers 6, such data is written in the main memory (or a file on the disk) of such server 6. In FIG. 3, reference numeral 12 denotes a time stamp table; 13, a place to which a time stamp of the time stamp table 12 is written; and 14, a place to which a 64-KB block number corresponding to a time stamp 13 is written, with one horizontal row being dedicated to a single video camera 8. When 64 KB of recorded data of a video camera 8 is written to a server 6, a time stamp 13 and a block number 14 are written to the row dedicated to the corresponding video camera 8 in the corresponding server 6 by the video camera control device 9. Since the time stamp 13 can express values in terms of from years to seconds, any time herein handled can be deemed an absolute time. The block number 14 denotes the number of a block in which 64 KB of recorded data is stored. In FIG. 2, the numbers (0) to (17) dedicated to a single video camera correspond to the block numbers 14. When 64 KB of recorded data has been completely written to a server 6, the video camera control device 9 writes a pair of time stamp 13 and block number 14 to a file (the time stamp table 12) within such server 6. This information is utilized at the time of playing back recorded data from the monitor device 4a.

How video data is played back by a monitor device 4a will be described next. A monitor device 4a reads from all the servers 6 a row in the time stamp table 12, the row being dedicated to a video camera from which data is to be played back. For example, to play back pictured data of video camera 8 (1), pairs of time stamp 13 and block number 14 in the uppermost row are read from all the servers 6. Pictured data at the newest time is selected from the read time stamps 13. That is, recorded data corresponding to the newest video data of video camera 8 (1) is stored in the block number corresponding to such selected time stamp 13. A monitor device 4a can play back the recorded data freely with such block as a starting point. It takes 0.43 sec to play back 64 KB of data. Therefore, in order to play back video data that starts 3.44 sec before, what is needed is to sequentially read and play back recorded data 8 blocks before the aforementioned newest block (8 blocks=3.44/0.43 with the newest block inclusive). Here, while an error of 0.43 sec is included in the time, correctly speaking (in the case where the block size=64 KB), such error is negligible to human eyes. For example, if the newest block number is block (15) (server 6 (0), DK (2)) in FIG. 2, then what is needed is to start playing back data of block (8) that is 8 blocks before block (15) with the newest block (15) inclusive. That is, a monitor device 4a sequentially reads data in such a manner that the monitor device 4a request server 6 (2) to read recorded data in block (8), receives 64 KB of recorded data from server 6 (2), then requests server 6 (0) to read data in block (9), receives 64 KB of recorded data from server 6 (0), and so on. The data request is made any time at an interval so as to match a speed of 1.2 Mbps, which is recorded data playback speed. The thus read recorded data is sequentially expanded, reproduced, and displayed as a video picture on the screen of a monitor device 4a. It is apparent that fast forward and playback, fast rewind and playback, rewind, forward, etc. can be implemented based on this technique. While the recording time of each camera in the example is set to as short as 7.68 sec for simplification purposes, the recording time in an actual application is usually set to tens of minutes to several hours. Therefore, it never happens that a single recording cycle (7.68 sec in this example) has disadvantageously ended during fast rewind and playback to suddenly change the screen to the newest video picture.

How a live video picture of a video camera 8 can be seen by a monitor device 4a will be described next.

In FIG. 1, there are two 100-Mbps Ethernet LANs 7. Using the generally known LAN's broadcast function, a live video picture can be supplied from video camera control devices 9 to monitor devices 4a as long as these control and monitor devices are connected to the same LAN 7. That is, all the video camera control devices 9 send recorded data to a LAN 7 in the broadcast mode. In this case, the video server 5 causes a specified server 6 to pick up and store the recorded data. At the same time, a monitor device 4a from which this video picture is seen live also picks up this broadcast data from the LAN and displays the broadcast data on the screen thereof. It is in this way that a live video picture can be sent from video camera control devices 9 to monitor devices 4a, both devices being connected to a single LAN 7 using the broadcast function.

If, on the other hand, the operator wishes to watch a video picture from a video camera control device 9 that is connected to the other LAN 7 to which the monitor device 4a is not connected, the aforementioned broadcast technique cannot be used. Of course, it is possible to see the video picture if both LANs 7 are connected to each other through a repeater. However, this technique reduces the bandwidth to a half, making the two-LAN design meaningless. The following pseudo-live video system will give a solution to this problem. The pseudo-live video system is designed to play back video data only slightly behind live playback (pseudo-live video data is played back about 1 sec behind live playback in this embodiment). As a result of this system, a pseudo-live video picture from an arbitrary one of video cameras 8 can be seen from an arbitrary one of monitor devices 4a in the whole system shown in FIG. 1.

An operation of the system in the case where a pseudo-live video picture is seen from a monitor device 4a will hereunder be described. A monitor device 4a reads a row dedicated to a desired video camera in the time stamp table 12 shown in FIG. 3 from all the servers 6. Then, the second newest time stamp 13 is searched from the row. The monitor device 4a thereafter starts reading and playing back block-based recorded data from a position designated by the block number 14 corresponding to the time stamp 13 through the corresponding server 6.

The reason why recorded data is read from the second newest block is to ensure that the second block has already been written. That is, the monitor device 4a double-buffers data on a 64 KB basis, and this means that the monitor device 4a reads two blocks of data ahead. Therefore, the second newest block is read to ensure that this second block has already been written. Alternatively, if this synchronization control is implemented carefully, playback can be started from the newest block, not from the second newest block; i.e., pseudo-live playback can be implemented with less delay from live playback. As a result of this technique, a pseudo-live video picture can be sent from an arbitrary one of video camera control devices 9 to an arbitrary one of monitor devices 4a.

As a result of the aforementioned construction, compressed video pictures taken by the respective video cameras 8 (1) to (2m) are concurrently recorded in the video server 5, and this video data can be seen freely in the form of a pseudo-live video picture or a recorded video picture from an arbitrary monitor device 4a. The system of storing a series of continuous data such as a single video stream over a plurality of disks is called data striving. While it is common practice to strive data over a plurality of disks within a single disk array device, the following two advantages can be provided when data is striven also over a plurality of servers 6 as in this embodiment.

(1) Since recorded video pictures taken by all the video cameras 8 are stored in a single place in a network, i.e., in the video server 5, the recorded video pictures stored in the video server 5 can be played back freely on the spot by monitor devices 4a.

(2) Since the video server 5 includes a plurality of servers 6 and data of a single video camera is stored while striven over such plurality of servers 6, a load applied to each server 6 is reduced to 1/(number of servers 6). In the system construction shown in FIG. 1, bottlenecks in the performance of a video server (how many video pictures from video cameras that can be simultaneously recorded, or how many video streams that can be simultaneously played back) are derived from the CPU performance of a server 6, the I/O performance of the disk of a server 6, the transfer performance of a network 7, and performance on the part of a client (the video cameras 8, video camera control devices 9, and monitor devices 4a of the client). According to the experiment conducted by the present applicant, it has been verified that it is the CPU performance that bottlenecks a server 6 in such a construction as shown in FIG. 1. That is, the load applied to a server 6 is reduced to 1/(number of servers 6), so that the load applied to the CPU of a server 6 is likewise reduced to 1/(number of servers 6), which in turn provides the advantage that the number of video streams that can be recorded/played back is increased to a multiple of (number of servers 6).

It is apparent that this embodiment is applicable to the case where the number of servers 6 is only one. Further, while a single video camera control device 9 is connected to a single video camera 8 in this embodiment, a single video camera control device 9 may be connected to a plurality of video cameras 8 so that the single video camera control device 9 may control the plurality of video cameras 8 simultaneously.

(Embodiment 2)

Figure 4:
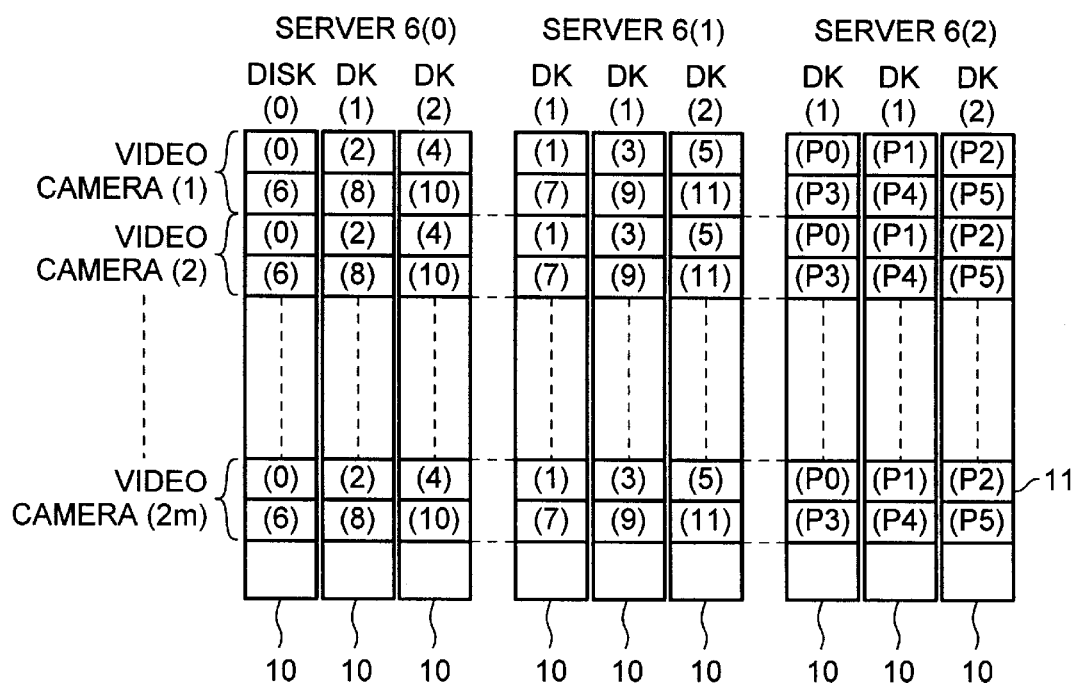
FIG. 4 is a diagram illustrative of a data arrangement on disks in mode of embodiment 2 of the invention.

In Embodiment 1, a video server system corresponding to RAID0 in a distributed RAID system has been presented. In contrast thereto, presented in Embodiment 2 is a video server system corresponding to RAID4 that has improved reliability function, in which even if one of a plurality of servers 6 fails, recorded data up to such moment of failure is not lost and the processing can therefore be continued. FIG. 1 also serves as a constructional diagram for Embodiment 2 similarly to Embodiment 1. It is FIG. 4 that shows a data arrangement on disks in servers 6 in Embodiment 2. FIG. 4 is distinguished from FIG. 2 for Embodiment 1 in the content of data (the arrangement of data) within a block 11. In FIG. 4, server 6 (2) is called a parity server having only parities instead of data. The content of block (P0) is obtained by exclusive-ORing data in block (0) and data in block (1) bit-to-bit. Similarly, the content of block (P1) is obtained by exclusive-ORing data in block (2) and data in block (3), and so on. Groups of blocks tied through parities (e.g., ((0), (1), (P0)) and ((2), (3), (P1))) are called parity groups. When parities such as (P0), (P1) . . . are appended, there is an advantage that data can be recovered even if a single server 6 out of a plurality of servers 6 is disconnected due to failure. For example, if block (1) cannot be read due to server 6 (1) having failed, block (1) is obtained by exclusive-ORing block (0) and block (P0). Therefore, through this operation, data in block (1) that is in failing server 6 (1) can be recovered, thereby allowing the processing to be continued.

Figure 5:
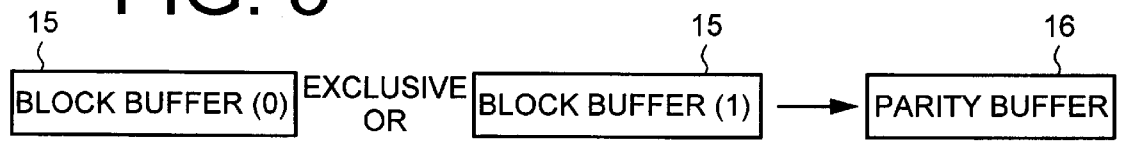
FIG. 5 is a diagram illustrative of an operation of buffers in embodiment 2 and 3 of the invention.

An operation of a video camera control device 9 in Embodiment 2 will be described. Embodiment 2 is characterized as storing parity block (P0) in server 6 (2). The same procedure as in Embodiment 1 applies to storing compressed video data in blocks (0), (1) within the video server 5. On the other hand, what distinguishes Embodiment 2 from Embodiment 1 is data buffering, which is implemented in the following way. FIG. 5 is a diagram illustrative of an operation of block buffers used to generate a parity. In FIG. 5, reference numeral 15 denotes a data block buffer, which is prepared on a main memory of a video camera control device 9. The number of data block buffers is equal to the number of servers 6 minus 1. Since there are 3 servers, there are 2 data block buffers in Embodiment 2. Reference numeral 16 denotes a parity buffer. There is only one parity buffer. Video data sent from a video camera 8 is compressed, etc. and thereafter stored in block buffer 15 (0) in the form of recorded data. When block buffer 15 (0) becomes full with 64 KB of recorded data having been sent thereto, the recorded data is transferred to a server 6. Even after the transfer has been completed, the content of block buffer 15 (0) is preserved. Successive data from the video camera 8 is stored in block buffer 15 (1), and when block buffer 15 (1) becomes full of data, the data is transferred to a server 6. Simultaneously therewith, parity calculation is started within the corresponding video camera control device 9.

That is, the content of block buffer 15 (0) and the content of block buffer 15 (1) are exclusive-ORed sequentially from the top, and the results are stored in the parity buffer 16. After 64 KB of data has been exclusive-ORed and the content of block buffer 15 (1) has been transferred to the server 6, the content of the parity buffer 16 is then transferred to server 6 (2) and stored in block (P0) shown in FIG. 4. Since the CPU of the video camera control device 9 operates at an adequately high speed, the exclusive-OR operation can be terminated within a period as short as about 100 msec. Therefore, storage of succeeding compressed data into block buffer 15 (0) is stopped. Upon end of the exclusive-OR operation, such stoppage is released, so that storage of succeeding data into block buffer 15 (0) is resumed. While the number of block buffers 16 is 2 since there are 3 servers 6 in Embodiment 2, the number of block buffers 15 becomes 3 if there are 4 servers 6. In this case, the exclusive-OR operation is performed twice. That is, first block buffer 15 (0) is exclusive-ORed with block buffer 15 (1); the result of the first exclusive-OR operation is exclusive-ORed with another block buffer; and the result of the second exclusive-OR operation is stored in the parity buffer 16 as the final result. As described above, the additional operation of storing data in the parity block 16 must be performed by a video camera control device 9 in Embodiment 2.

A condition in which servers 6 are operated with one of them disconnected due to failure is called degenerative operation. In this case, a video camera control device 9 does not perform ordinary operation with respect to such disconnected server 6. Other than this, the video camera control device 9 performs operation similar to ordinary recording.

In such a recording operation, e.g., in a recording operation for a single horizontal row shown in FIG. 4, the load on the server side and the network load are the same as those in Embodiment 1, but the volume of video data that can be recorded during this recording operation is reduced to (number of servers 6−1)/(number of servers 6). That is, recording performance drops in proportion to such reduction in the volume of video data, which in turn reduces the number of video cameras 8 that can operate simultaneously as a system. Further, during playback, data is read from servers that total (number of servers 6−1), so that the number of monitor devices 4*a* that can operate simultaneously is reduced in the same proportion. The aforementioned performance is applicable during degenerative operation.

Figure 6:
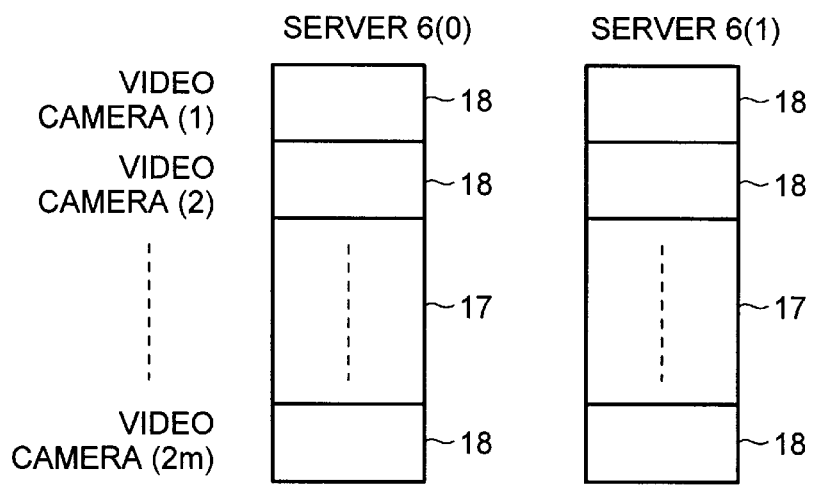
FIG. 6 is a diagram showing a format of a newest group table in embodiment 2 and 3 of the invention.

FIG. 6 is a diagram showing a format of the newest group table 17 used in Embodiment 2. The newest group table 17 corresponds to the time stamp table 12 shown in FIG. 3. In comparison with the case of FIG. 3, the newest group table 17 is characterized as having no time stamp value and as being arranged only in the first two servers 6. Further, the newest group table 17 is also characterized as using a parity group number 18 instead of a block number 14. Upon completion of transfer of a single parity group (several blocks) of video data to the video server 5, a video camera control device 9 updates the newest group table 17. That is, a parity group number 18 is written to a portion in the newest group table 17 dedicated to the video camera. The same content is written to the first two servers 6 so that when one of the two servers fails, the other can back up. When there are many servers 6, it is only these first two servers that are loaded as a result of this writing operation, so that it may be likely to break the balance. However, since the newest group table 17 data writing load is sufficiently small compared with the recorded data writing load, there is no problem.

Figure 7:
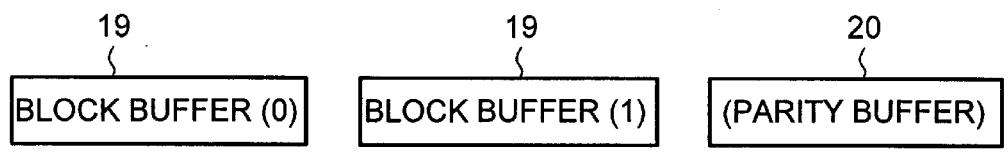
FIG. 7 is a diagram illustrative of buffers in modes of embodiment 2 and 3 of the invention.

A playback operation in a monitor device 4*a* will be described next. A monitor device 4*a* reads from server 6 (0) a row in the newest group table 17 dedicated to a desired video camera 8. As a result of this operation, the most newly stored parity group is specified. Similarly to Embodiment 1, a recorded place of video data that has been recorded in a past timing can be searched with the specified newest parity group as a starting point. Playback, fast forward and playback, fast rewind and playback, rewind, forward, etc. can be implemented from this operation. In Embodiment 2, playback is implemented not on a block basis, but on a parity group basis. FIG. 7 is a diagram showing a format of a buffer arranged in the main memory of a monitor device 4*a*, the buffer serving for parity group-based playback. Once a parity group from which playback is to be started has been specified, a monitor device 4*a* sequentially reads recorded data on a 64-KB block basis from the respective servers 6. For example, to start playback from parity group (P4) in FIG. 4, block (8) is read to block buffer 19 (0) shown in FIG. 7 from server 6 (0). Then, block (9) shown in FIG. 4 is read to block buffer 19 (1) shown in FIG. 7 from server 6 (1). It may be noted that if server 6 (0) and server 6 (1) are normal, no data is read from the parity server (server 6 (2)). Upon completion of reading the parity group as a whole, the recorded data is subjected to a data expansion process, and played back and displayed on a screen.

Figure 8:
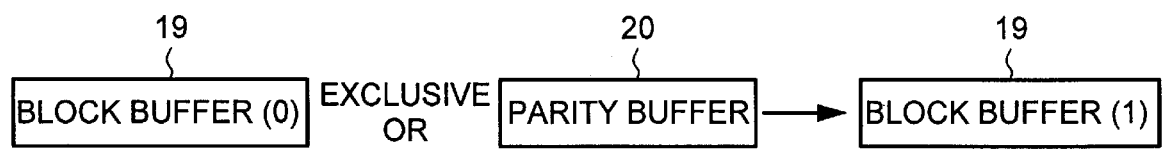
FIG. 8 is a diagram illustrative of an operation of the buffers in embodiment 2 and 3 of the invention.

A playback operation at the time one of the servers 6 is disconnected due to failure will be described next. FIG. 8 is a diagram illustrative of how block buffers 19 and the parity buffer 20 operate in this case. The components and contents in FIG. 8 are completely the same as those in FIG. 7. A case where parity group (P4) is read with server 6 (1) failing will be described as an example. A monitor device 4*a* reads block (8) to block buffer 19 (0) from server 6 (0) as shown in FIG. 8. Then, parity (P4) is read to the parity buffer 20 from server 6 (2) that is the parity buffer shown in FIG. 4. Then, recorded data in the two read blocks are exclusive-ORed bit-to-bit, and the result is stored in block buffer 19 (1). As a result of this operation, the content of block (9) in server 6 (1) has been recovered. In a manner similar to normal playback, the content of block buffers 19 (0) (1) are thereafter sent to the data display system and displayed on the screen.

The pseudo-live video picture playback system is based on the same concept as in Embodiment 1. In the case of Embodiment 2, recorded data is processed not on a block basis, but on a parity group basis unlike in Embodiment 1. Therefore, in Embodiment 2, delay from live playback slightly increases. To see a pseudo-live video picture from a monitor device 4*a*, the pseudo-live playback system in Embodiment 2 is distinguished from that in Embodiment 2 in that pseudo-live playback is started from recorded data corresponding to the content written to the newest parity block number 18 in the newest group table 17 shown in FIG. 6.

The following three advantages are provided by Embodiment 2.

(1) Since recorded video pictures taken by all the video cameras 8 are stored in a single place in a network, i.e., in the video server 5, the recorded video pictures stored in the video server 5 can be played back freely and easily on the spot by monitor devices 4*a*.

(2) Since the video server 5 includes a plurality of servers 6, and therefore the recording process of recorded data and the distributing process of playback data to monitor terminals in the video server 5 are shared by the plurality of servers 6. Therefore, a load to be applied to a single server 6 is reduced. Therefore, in terms of the video server 5, there is an advantage that the number of video cameras 8 that can record data concurrently and the number of monitor devices 4a that can supply playback data simultaneously are increased in proportion to the number of servers 6.

(3) Since the so-called RAID4 system in which parities are stored in addition to data is adopted, even if one of the plurality of servers 6 has failed, recorded data thus far recorded is not lost and the processing can therefore be continued. This provides the advantage that reliability is significantly improved.

While a single video camera control device 9 is connected to a single video camera 8 in Embodiment 2, a single video camera control device 9 may be connected to a plurality of video cameras 8 so that the single video camera control device 9 may control the plurality of video cameras 8 simultaneously.

(Embodiment 3)

Embodiment 2 corresponds to RAID4 in the distributed RAID video server system. In contrast thereto, video data record/playback system according to Embodiment 3 corresponds to RAID5. That is, similar to Embodiment 2, Embodiment 3 has improved reliability function in which even if one of a plurality of servers 6 has failed, recorded data thus far made is not lost and the processing can therefore be continued. In this case, when reading recorded data at the time of normal operation, a monitor device 4a reads such data from all the servers since there is no parity server. Therefore, reading performance is improved, which in turn provides the advantage that a larger number of monitor devices 4a can be connected in proportion to the improved reading performance.

Figure 9:
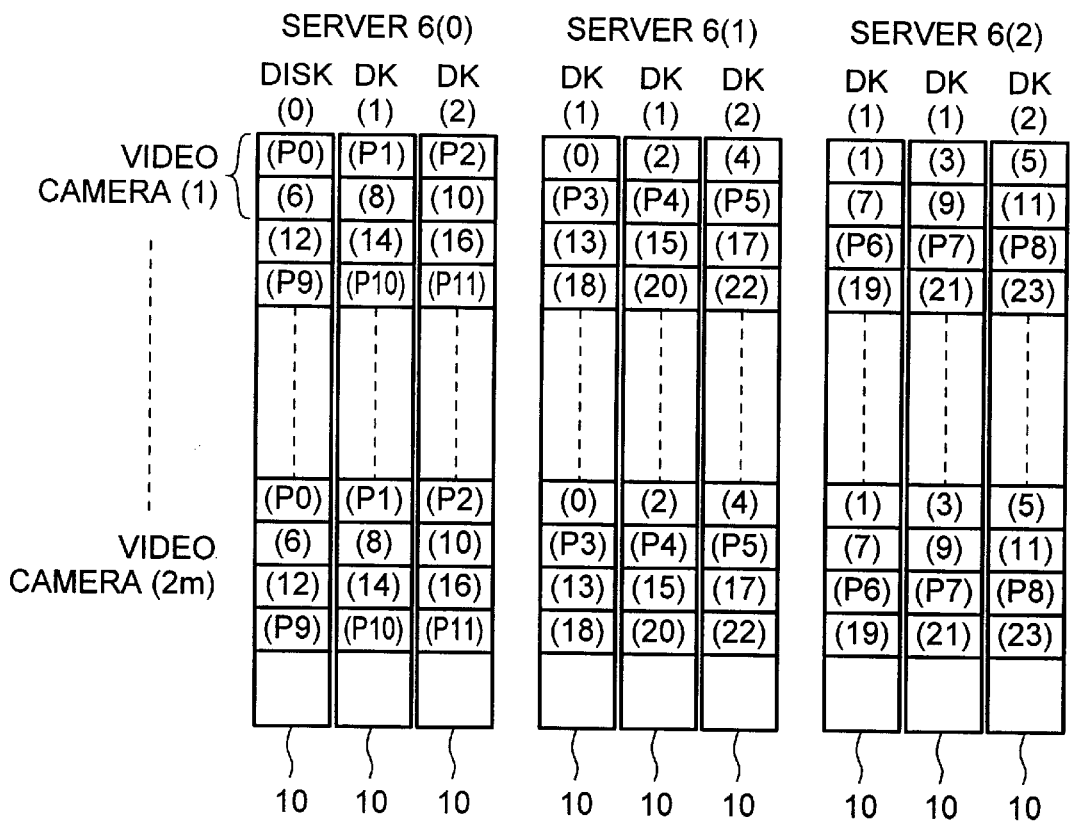
FIG. 9 is a diagram illustrative of a data arrangement on disks in mode of embodiment 3 of the invention.
Figure 10:
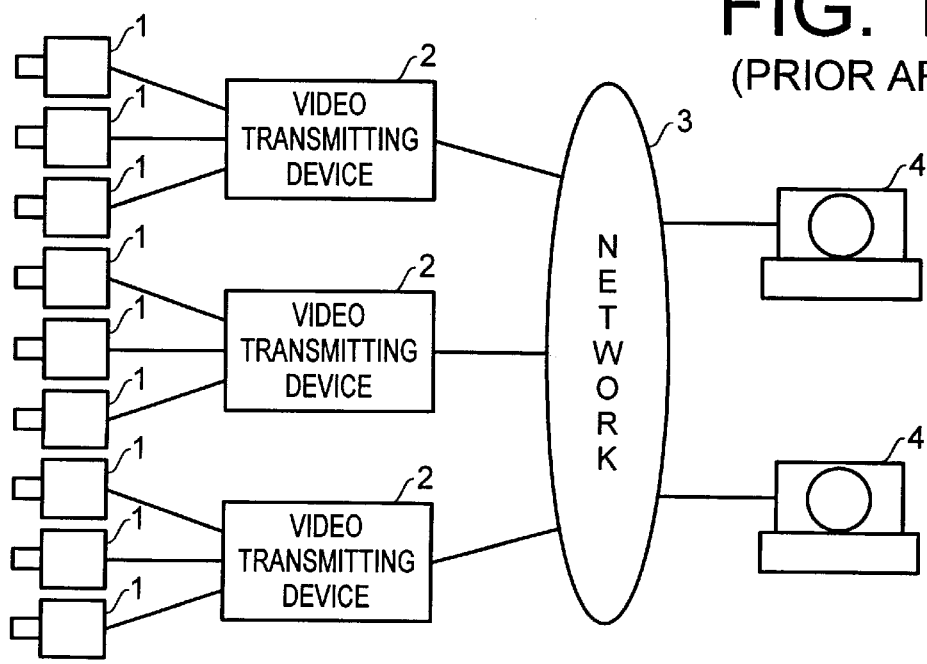
FIG. 10 is a constructional diagram showing a conventional video monitor system.

FIG. 1 also serves as a constructional diagram for Embodiment 3 in a manner similar for Embodiment 2. FIG. 9 shows a data arrangement on disks in servers 6 in Embodiment 3. In FIG. 9, parity arrangement is different from that in FIG. 4 dedicated to Embodiment 2. That is, parities do not concentrate on a single server 6, but are distributed over all the servers 6. An operation in Embodiment 3 is similar to that in Embodiment 2 except that parity arrangement is different and that recorded data positions are accordingly different. Therefore, the explanation given to Embodiment 2 is directly applicable. For example, when a video camera control device 9 makes a recording to the video server 5, the operation of storing blocks (0), (1) and parity (P0) in the video server 5 is indicated in Embodiment 2. This operation similarly applies to Embodiment 3, and the only thing that distinguishes FIG. 9 from FIG. 4 is the positions of blocks (0), (1) and parity block (P0) in the horizontal direction. Therefore, the description of the operation of Embodiment 3 will be omitted.

The following four advantages are brought about by Embodiment 3.

(1) Recorded video pictures taken by all the video cameras 8 are stored in a single place in a network, i.e., in the video server 5. These recorded video films stored in the video server 5 can be played back freely and easily on the spot by monitor devices 4a.

(2) Since the video server 5 includes a plurality of servers 6, and therefore the recording process of recorded data 5 and the distributing process of playback data to monitor terminals in the video server 5 are shared by the plurality of servers 6. Therefore, the load to be applied to a single server 6 is reduced. Therefore, there is an advantage that the number of video cameras 8 that can record data concurrently and the number of monitor devices 4a that can supply playback data simultaneously increase in proportion to the number of servers 6 in terms of the video server 5 as a whole.

(3) Since the so-called RAID4 system in which parities are stored in addition to data is adopted, even if one of the plurality of servers 6 has failed, recorded data thus far recorded is not lost and the processing can therefore be continued. This provides the advantage that reliability is significantly improved.

(4) Since the so-called RAID5 system in which parities do not concentrate on a specific server 6 but are distributed over the entire part of a plurality of servers 6 is adopted, all the servers 6 operate during normal playback in which no server 6 is disconnected. This provides the advantage that processing performance is improved and that the number of monitor devices 4a that can play back simultaneously is therefore increased.

While a single video camera control device 9 is connected to a single video camera 8 in Embodiment 3, a single video camera control device 9 may be connected to a plurality of video cameras 8 so that the single video camera control device 9 may control the plurality of video cameras 8 simultaneously.

As was described in the foregoing, according to the invention, a video data record/playback system is constructed in such a manner that a control device processes continuous video data of each one of data generating means into block-based recorded data and storing the block-based recorded data onto a plurality of storage devices horizontally through a server in a predetermined order; and that a video data playback device plays back and displays block-based recorded data by reading the block-based recorded data corresponding to an arbitrary data generating means from an arbitrary position in the plurality of storage devices through the server. Therefore, video data of all the data generating means is stored in the plurality of storage devices connected to the server. As a result, the invention can provide the advantage that recorded data of an arbitrary data generating means stored in the server can be freely played back and displayed on the spot by the video data playback device.

Further, according to another aspect of the invention, the video data record/playback system is constructed in such a manner that a plurality of servers are arranged; a control device stores recorded data in a plurality of storage devices on a block basis through the plurality of servers horizontally in a predetermined order; and a video data playback device plays back and displays block-based recorded data by reading the block-based recorded data corresponding to an arbitrary data generating means from an arbitrary position in the plurality of storage devices through the plurality of servers. Therefore, recorded data of a single data generating means is stored while striven over a plurality of servers, which in turn reduces the load applied to each server to 1/(number of servers) and increases the number of data streams that can be recorded/played back to a multiple of (number of servers). As a result, the invention can provide the advantage that the number of data generating means and video data playback devices can be increased.

Further, according to still another aspect of the invention, the video data record/playback system is constructed in such a manner that a plurality of video data playback devices are arranged. As a result, the invention can provide the advantage that an arbitrary video data playback device can play back and display recorded data by reading the recorded data corresponding to an arbitrary data generating means from an arbitrary position in a plurality of storage devices through a server.

Further, according to still another aspect of the invention, the video data record/playback system is constructed in such a manner that a server has a table indicating a predetermined order in which block-based recorded data corresponding to video data of each data generating means is stored in a plurality of storage devices horizontally. As a result, the invention provide the advantage that a video data playback device can play back and display block-based recorded data by reading the newest one of the block-based recorded data corresponding to an arbitrary data generating means from the plurality of storage devices based on the table.

Further, according to still another aspect of the invention, the video data record/playback system includes: a control device processes continuous video data of each one of data generating means into block-based recorded data, calculating a parity value from a predetermined number of pieces of block-based recorded data bit-to-bit, and transferring the predetermined number of pieces of block-based recorded data and the parity value to a plurality of servers horizontally so that the predetermined number of pieces of block-based recorded data and the parity value are stored in a plurality of storage devices in a predetermined order; and a video data playback device that, if one of the servers has failed when the block-based recorded data corresponding to an arbitrary data generating means is to be played back while read from the plurality of storage devices through the servers, plays back and displays block-based recorded data by recovering from the parity value the block-based recorded data stored in a storage device connected to the failed server. As a result, the invention can provide the following three advantages.

(1) Since recorded data of all the data generating means is stored in a plurality of storage devices connected to the respective servers, the recorded data of an arbitrary data generating means stored in the servers can be played back and displayed freely on the spot by the video data playback device.

(2) Since recorded data of a single data generating means is stored while striven over a plurality of servers, the load applied to each server is reduced to 1/(number of servers 6), and the number of data streams that can be recorded/played back is increased to a multiple of (number of servers 6).

(3) Since the so-called RAID4 system in which parities are stored in addition to recorded data is adopted, even if one of a plurality of servers has failed, recorded data thus far recorded is not lost and the processing can therefore be continued. This provides the advantage that reliability is significantly improved.

Further, according to still another aspect of the invention, the video data record/playback system is constructed in such a manner that tables are arranged at least in two of a plurality of servers; a control device forms recorded data for a predetermined number of pieces of block-based recorded data corresponding to each one of data generating means and a parity value into a parity group, and writes to the tables an order of storing the parity group in the plurality of storage devices; and a video data playback device plays back and displays recorded data by reading from the plurality of storage devices the recorded data of the newest parity group corresponding to an arbitrary data generating means based on the tables. As a result, the invention can provide the advantage that the video data playback device is informed of the position of the newest block of the recorded data even without employing the technique of causing both the control device and the video data playback device to be synchronized in terms of absolute time. As a result, the invention can provide the advantage that software can be designed flexibly.

Further, according to still another aspect of the invention, the video data record/playback system is constructed in such a manner that when recorded data is to be played back, a video data playback device takes data for a single parity group into a buffer from a plurality of storage devices in a predetermined order, and plays back and displays block-based recorded data by recovering the block-based recorded data stored in a storage device connected to a failing server. Therefore, the data read from the server can be used not only as display data, but also as recovery data. As a result, the invention can provide the advantage that the load applied to each server and the load applied to transfer lines can be reduced, which in turn allows system performance to be improved.

Further, according to still another aspect of the invention, the video data record/playback system is constructed in such a manner that a video data playback device plays back and displays video data of a predetermined data generating means by directly inputting block-based recorded data outputted from a control device. As a result, the invention can provide the advantage that a genuine live video picture can be processed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A video data record/playback system, comprising:
    a plurality of data generating means for generating continuous video data;
    a plurality of storage devices for storing digitized recorded data based on the video data on a block basis;
    a plurality of servers, each said server being operatively connected to at least one of said plurality of storage devices, for accessing the recorded data stored on said plurality of storage devices on the block basis;
    a control device, operatively connected to each of said data generating means, for processing the continuous video data of each one of said data generating means into the block-based recorded data and for transferring said block-based recorded data to said plurality of servers for storage on said plurality of storage devices horizontally in a predetermined order; and
    a video data playback device for playing back and displaying block-based recorded data corresponding to an arbitrary one of said data generating means from an arbitrary position in each of said plurality of storage devices through said plurality of servers.

2. A video data record/playback system according to claim 1, wherein said video data playback device comprises a plurality of video data playback devices;
    an arbitrary video data playback device plays back and displays block-based recorded data by reading the block-based recorded data corresponding to an arbitrary data generating means from an arbitrary position in a plurality of storage devices through said server.

3. A video data record/playback system according to claim 1, wherein each said server has a table indicating a predetermined order in which block-based recorded data corresponding to video data of each of said data generating means is stored in said plurality of storage devices horizontally; said video data playback device playing back and displaying the block-based recorded data by reading the newest one of the block-based recorded data corresponding to an arbitrary data generating means from said plurality of storage devices based on the table.

4. The video data record/playback system of claim 1 wherein each said server is connected to plural said storage devices.

5. A video data record/playback system, comprising:
- a plurality of data generating means for generating continuous video data;
- a plurality of storage devices for storing digitized recorded data based on the video data on a block basis;
- a plurality of servers, each said server being operatively connected to at least one of said plurality of storage devices, and accessing the recorded data stored on said plurality of storage devices on the block basis;
- a control device, operatively connected to each of said data generating means, for processing the continuous video data of each one of said data generating means into the block-based recorded data, calculating a parity value from a predetermined number of pieces of the block-based recorded data bit-to-bit, and transferring the predetermined number of pieces of the block-based recorded data and the parity value to said plurality of servers horizontally so that the predetermined number of pieces of the block-based data and the parity value are stored in said plurality of storage devices in a predetermined order; and
- a video data playback device that, if one of the servers has failed when the block-based recorded data generated by an arbitrary one of said data generating means is to be played back by being read from the plurality of storage devices through said servers, plays back and displays the block-based recorded data by recovering from the parity value the block-based recorded data stored in a storage device connected to the failed server.

6. A video data record/playback system according to claim 5, wherein tables are arranged at least in two of said pluralities of servers; said control device forming recorded data for a predetermined number of pieces of block-based recorded data corresponding to each data generating means and a parity value into a parity group, and writing to the tables an order of storing the parity group in the plurality of storage devices;
said video data playback device playing back and displaying recorded data by reading from said plurality of storage devices the recorded data of the newest parity group corresponding to an arbitrary data generating means based on the tables.

7. A video data record/playback system according to claim 5, wherein said video data playback device has a buffer for accommodating data for a single parity group including a predetermined number of pieces of block-based recorded data and a parity value corresponding to each of said data generating means; when the recorded data is played back, said video data playback device storing the data for the single parity group into said buffer from said plurality of storage devices in a predetermined order, and playing back and displaying block-based recorded data by recovering the block-based recorded data stored in a storage device connected to a failed server.

8. A video data record/playback system according to claim 1, wherein said video data playback device plays back and displays video data of a predetermined data generating means by directly inputting block-based recorded data outputted from said control device.

9. A video data record/playback system according to claim 5, wherein said video data playback device plays back and displays video data of a predetermined data generating means by directly inputting block-based recorded data outputted from said control device.

10. The video data record/playback system of claim 5 wherein each said server is connected to plural said storage devices.

* * * * *